US005125473A

United States Patent [19]

Sakamoto et al.

[11] Patent Number: 5,125,473

[45] Date of Patent: Jun. 30, 1992

[54] SPEAKER DAMPER CONFIGURATION

[75] Inventors: Yoshio Sakamoto, Tokyo; Akihiko Haga, Yamagata, both of Japan

[73] Assignees: Kabushiki Kaisha Kenwood; Mogami Denki Kabushiki Kaisha, both of Tokyo, Japan

[21] Appl. No.: 675,033

[22] Filed: Mar. 25, 1991

Related U.S. Application Data

[63] Continuation of Ser. No. 435,952, Nov. 14, 1989, abandoned.

[30] Foreign Application Priority Data

Nov. 15, 1988 [JP] Japan .................................. 63-2866
Mar. 9, 1989 [JP] Japan .............................. 1-26114[U]

[51] Int. Cl.[5] ............................................ G01V 1/06
[52] U.S. Cl. .................................................. 181/116
[58] Field of Search ............... 181/166, 157, 167, 168, 181/170, 175; 381/158

[56] References Cited

U.S. PATENT DOCUMENTS 2,624,417 1/1953 Brennan ......................... 181/172 X

FOREIGN PATENT DOCUMENTS 0044451 12/1979 Japan .................................. 181/166
1109998 4/1989 Japan .................................. 181/170

*Primary Examiner*—L. T. Hix
*Assistant Examiner*—Eddie C. Lee
*Attorney, Agent, or Firm*—Sixbey, Friedman, Leedom & Ferguson

[57] ABSTRACT

Conductive members are sewed and mounted to a damper main body. The conductive members are made of a woven wire which is formed by winding double conductive foils. The shape of the corrugations of the damper increases as the position approaches from the inner periphery to the outer periphery.

5 Claims, 4 Drawing Sheets

SPEAKER DAMPER CONFIGURATION

This application is a continuation of Ser. No. 07/435,952, filed Nov. 14, 1989, now abandoned.

BACKGROUND OF THE INVENTION

1. Field of the Invention

The present invention relates to a speaker damper having a conductive member to input an audio signal to a voice coil and also relates to method and apparatus for manufacturing such a damper.

2. Description of the Related Art

Hitherto, to simplify a wiring structure to the voice coil, as shown in FIG. 1, there has been known a speaker damper comprising a damper main body 1 and two conductive members 2. The damper main body is constructed in a manner such that a thermosetting resin such as a phenol resin or the like is impregnated into a damper raw material comprising a cloth material such as woven cloth, unwoven cloth, or the like and a wove-shaped corrugation is integrally formed by a thermal molding work. The conductive materials are attached from the inner peripheral portion to the outer peripheral portion along the shape of the corrugation. The conductive members are used as current supplying means to a coil which is provided at the center of the damper.

As methods and apparatuses for manufacturing such a speaker damper, the following methods have been known.

(1) As shown in FIG. 2, after the conductive member was adhered onto the damper raw material comprising the cloth material such as woven cloth, unwoven cloth, or the like by using an adhesive agent, they are allowed to pass in a treating bath in which a thermosetting resin such as a phenol resin or the like which was diluted by a solvent is enclosed, thereby impregnating the thermosetting resin into the damper raw material. Then, the solvent is evaporated and the resin tackiness is eliminated. In this state, the damper is thermally molded with a molding die.

(2) The thermosetting resin which was diluted by a solvent is impregnated into the damper raw material comprising the cloth material. The solvent is evaporated and the resin tackiness is eliminated. In this state, the conductive members are adhered and, thereafter, the damper is thermally molded.

(3) The thermosetting resin which was diluted by a solvent is impregnated into the damper raw material comprising the cloth material. The solvent is evaporated and the resin tackiness is eliminated. In this state, the damper is thermally molded to obtain a damper main body. The conductive members comprising copper foils or woven wires are adhered onto the upper or back surface of the corrugation.

And the like.

FIG. 3 is a cross sectional view of dies to mold the damper as mentioned above.

The above-mentioned damper raw material or the damper raw material onto which the conductive members were adhered is thermally pressed and molded by upper and lower dies on which a number of convex and concave portions corresponding to the corrugations in FIG. 3 are annularly formed. However, as is well known, upon molding, the material, i.e., the damper raw material is molded while being pulled from the outer peripheral portion to the inner peripheral portion side. Therefore, the shape and number of corrugations, particularly, a width W and a depth D are set to values within ranges such that a damage of the material upon molding and a bending, a deformation, or the like after the molding do not occur.

In the above conventional speaker damper configuration, the conductive members are adhered to the damper main body and the resultant damper is attached. Therefore, there is a drawback such that when the damper is continuously vibrated at a large amplitude for a long time, the conductive members are peeled off from the corrugations and the peeled-off portions are come into contact with the back surfaces of the damper and the cone diaphragm and an abnormal sound is generated. There is also a drawback such that if the abnormal resonance is continued without keeping the proper shape in a state in which the conductive members were peeled off, the conductive members are cut out.

On the other hand, the conventional method of manufacturing the speaker damper described in the above items (1) to (3) has the following drawbacks in terms of the mass productivity.

According to the method of (1) whereby the thermosetting resin is impregnated after the conductive members were attached to the damper raw material, the thermal molding process is executed in a state in which the thermosetting resin is adhered to the conductive members. Therefore, the thermosetting resin adhered to the conductive members is hardened and becomes a good insulative material. When leak wires are connected, the hardened thermosetting resin must be eliminated, and the like. In this manner, the number of manufacturing steps increases. On the other hand, in the case of executing the work such that a masking process is executed to the conductive members or the thermosetting resin adhered to the conductive members is eliminated for the interval when it is hardened, or the like, the number of steps is increased in a manner similar to the above, resulting in an increase in costs.

Further, examination of the material of the adhesive agent which is used, method of coating the adhesive agent, and the like become complicated. For instance, in the case of a general rubber system adhesive agent, it takes a time until a predetermined adhesive strength is obtained. In the case of the adhesive agent of the reactive type such as an acrylic system or the like, a degree of hardness is too high, so that no corrugation can be molded or the like. As mentioned above, a selection range of the adhesive agent is extremely limited.

In the case of the method of (2) whereby after raw material, the solvent is evaporated, and the conductive members are adhered in a state in which the resin tackiness was eliminated, the drawback as in the item (1) which is caused due to the adhesion of the thermosetting resin to the conductive members does not occur. However, with respect to a point that the adhesive agent is used, there are drawbacks such that examination of the material of the adhesive agent and the method of coating the adhesive agent become complicated and the like in a manner similar to the item (1).

In the method of (3) whereby the conductive members are adhered after the damper main body was molded, the drawbacks as in the items (1) and (2) do not exist. However, there are drawbacks such that it is necessary to adhere the conductive members along the corrugations, a method of uniformly coating the adhesive agent along the corrugation is complicated, and the like.

On the other hand, in the case of adhering the conductive members in a state along the corrugations, the conventional speaker damper has the following drawbacks because the width W and depth D of the corrugations are set so as to have the same shape from the inner peripheral portion to the outer peripheral portion.

That is, the copper foils, woven wires, or the like which are generally used as conductive members have drawbacks such that cracks are generated in the conductive members upon molding since the deforming ratio is lower than that of the cloth material such as woven cloth, unwoven cloth, or the like. Particularly, cracks are easily generated near the first concave portion and the first convex portion on the inner peripheral portion side where a force to pull in the material such as conductive members largely acts. This is because the outer peripheral portion sides of the conductive members are cut out and become the free ends and the materials can easily move, but at the inner peripheral portion sides, the inner end is fixed, so that it is extremely difficult to move the material. Accordingly, as the position approaches the inner peripheral portion side, the force to pull in the material is large, so that a more number of cracks are generated in the inner peripheral portion.

As a method of avoiding such a state, there has been known a method whereby the material of the conductive members is divided into two portions at the intermediate position and both of the inner and outer peripheral portion sides are made free or a method whereby the conductive members such as not to generate any crack are arranged. However, the former method has a drawback such that the fairly large number of steps are needed. The latter method has a drawback such that after completion of the molding, internal stresses remain in the conductive members and the conductive members are easily deformed.

Hitherto, a woven wire has been used as conductive wire members. As is well known, the woven wire is formed in a manner such that a copper foil is wound around the twisted fiber and one thin wire-shaped line raw material is formed and a proper number of such line raw materials are selected as necessary and are woven. Therefore, since the copper foil of the woven wire is formed as a continuous spiral shape, the woven wire has a function such that even when the woven thread wire is largely bent, the copper foil can move in conformity with the bent state. Due to this, the wire material is flexible and bending stresses are hardly applied to the copper foil, so that the wire-cut resistance by the metal fatigue is extremely high. Consequently, the woven wire is most frequently used as a conductive material of the speaker which needs the flexibility and vibration resistance.

However, the conventional ordinary woven wire also inevitably has an inconvenience such that cracks are generated due to the vibration of the damper. As shown in FIG. 4, since the copper foils in the adhesive portion of the woven wire attached along the corrugations are fixed to the damper 1, the movable portions of the copper foils can move only on the opposite side of the adhesive portion, that is, only on the upper side in the diagram. Only about half of the inherent capability of the woven wire can be effected. Thus, if the severer conditions are set, the fixed portions of the copper foils, that is, the adhesive portions with the damper cannot help deforming in conformity with the amplitude of the damper, so that there is a fear such that cracks are finally generated due to the metal fatigue and the wire is cut out.

SUMMARY OF THE INVENTION

It is the first object of the invention that when conductive members are attached to a damper main body, movability is given to the attached conductive members and the flexibility can be maintained.

The second object of the invention is that when conductive members are attached along the surface of the damper main body having coaxial corrugations, it can be prevented that a damage such as cracks or the like occurs in the conductive members.

Further, the third object of the invention is to provide a method of manufacturing a damper comprising a damper main body having an excellent mass productivity and conductive members which are attached to the damper main body.

The above objects are solved by each of or a combination of a method whereby conductive members are sewed into a damper main body, a method whereby a configuration of the conductive members are made of a woven wire using double conductive foils, and a method whereby dimensions of the shape of corrugations of the damper are increased as the position approaches from the inner peripheral portion to the outer peripheral portion according to the invention.

DETAILED DESCRIPTION OF THE EMBODIMENTS

Figure 1:
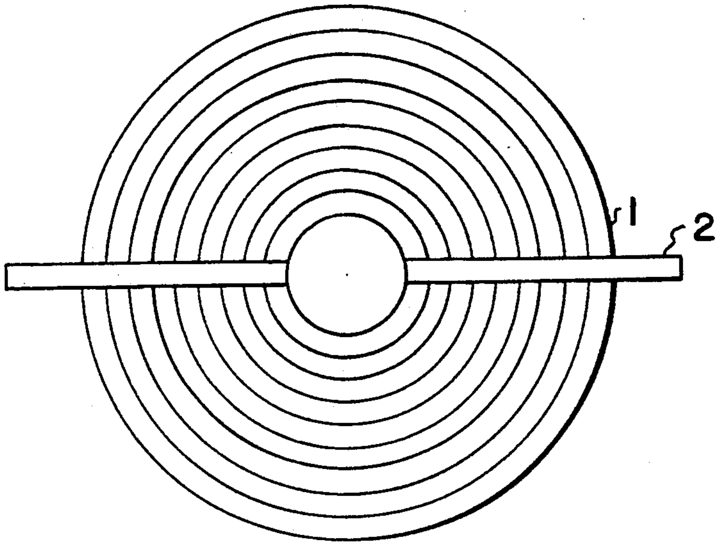
FIG. 1 is a diagram showing a conventional damper configuration.
Figure 2:
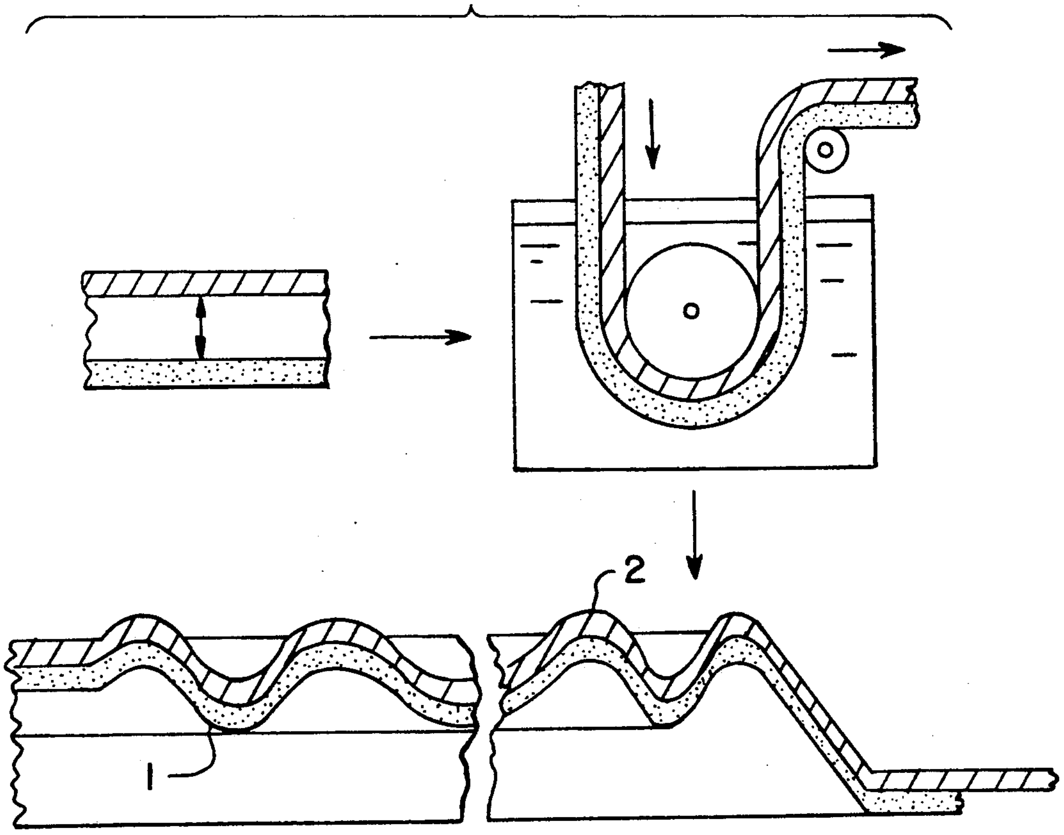
FIG. 2 PRIOR ART
FIG. 2 is a diagram showing a conventional damper manufacturing method and steps.
Figure 3:
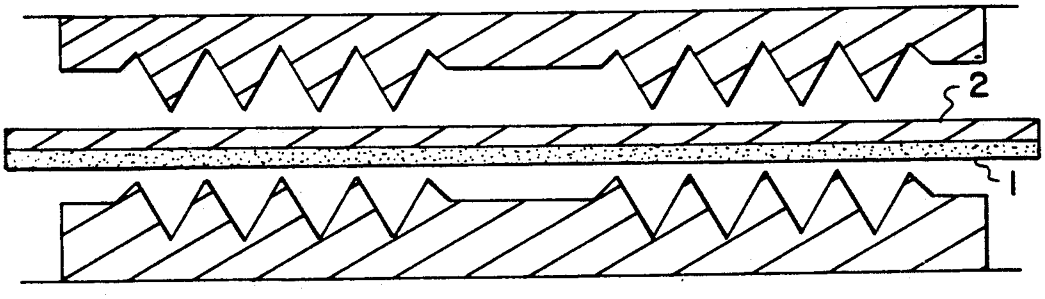
FIG. 3 is a diagram showing dies to corrugation mold a conventional damper.
Figure 4:
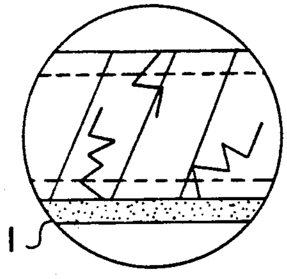
FIG. 4 is a diagram showing cracks which are generated in copper foils of a woven wire.
Figure 5B:
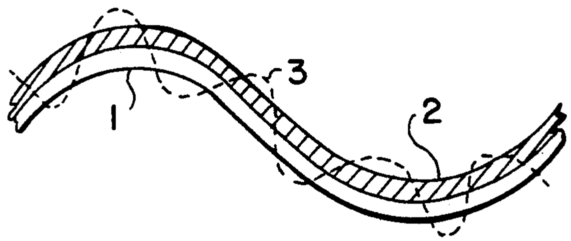
FIGS. 5A and 5B are diagrams showing an embodiment of a damper which is formed by sewing conductive members into a damper main body in accordance with the invention.
Figure 5A:
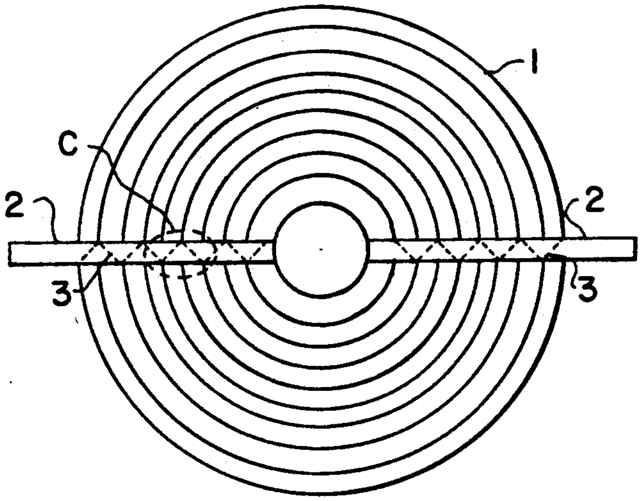

In FIG. 5A, reference numeral 1 denotes the damper main body. A thermosetting resin such as a phenol resin or the like which was diluted by a solvent is impregnated into a damper raw material comprising a cloth material such as woven cloth, unwoven cloth, or the like. The solvent is evaporated to eliminate the resin tackiness. In this state, the damper material is molded by thermal molding dies and concentric wave-shaped corrugations are integrally formed. In this manner, the damper main body 1 is formed. Reference numeral 2 indicates the conductive members which are attached along the shapes of the corrugations in the direction from the inner peripheral portion to the outer peripheral portion.

In the first embodiment, the conductive members 2 are sewed to the damper main body 1 molded as mentioned above along the shapes of the corrugations by using a fiber 3. FIG. 5B shows an enlarged cross sectional view of the portion shown by C in FIG. 5A.

Figure 6A:
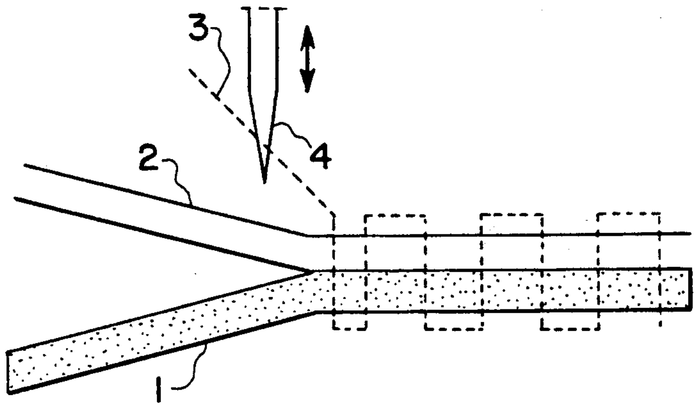
FIGS. 6A and 6B are diagrams showing a method and steps of manufacturing the damper of FIG. 5.
Figure 6B:
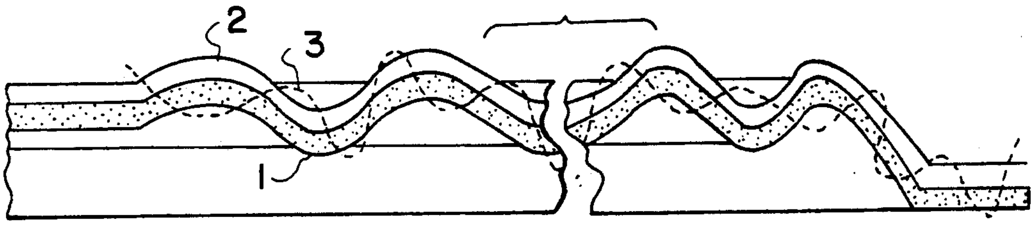

In the second embodiment, as shown in FIG. 6A, the damper raw material comprising the above cloth material is allowed to pass in the treating bath in which the thermosetting resin such as a phenol resin or the like which was diluted by a solvent is stored, thereby impregnating the thermosetting resin into the damper raw material. The solvent is evaporated and the resin tackiness is eliminated. In this state, the conductive members 2 are sewed to the damper raw material 1 by using a fiber (thread) 3. Such a sewing step can be easily realized by an industrial sewing machine 4.

After the conductive members 2 were attached as mentioned above, by thermally pressing and molding the damper by a molding die apparatus, the corrugations are integrally molded to the damper main body and the conductive members 2 are attached along the shapes of the corrugations.

In the above first and second embodiments, the plain weave woven wire which is frequently used in the conductive members of the speaker which requires the flexibility and the vibration resistance has been used as conductive members. However, an ordinary woven wire can be also obviously used.

According to the speaker damper of the invention, since the conductive members have been sewed along the shapes of the corrugations of the damper main body by using a fiber, different from the conventional adhesion method or the like, no adhesive agent layer is formed. Therefore, the conductive members can move by a certain degree and keeps a flexibility. Moreover, as compared with the conventional damper configuration, the conductive members can be extremely strictly mounted. Even if the damper is continuously vibrated at a large amplitude for a long time, the conductive members are not peeled off from the corrugation portions. Particularly, if the woven wire which is frequently used as conductive members of the speaker which need the flexibility and the vibration resistance is used as conductive members, the above flexibility can be further effected and the limit performance of the amplitude can be set to be fairly improved. Therefore, as compared with the conventional example, the performance can be remarkably improved and a range of the speaker in which the damper with the conductive portions can be used is widened.

Further, in the method of manufacturing the speaker damper of the invention, after the conductive members were sewed by a fiber to the damper raw material from which the resin tackiness had been eliminated, the damper material is thermally molded and the damper is manufactured. Therefore, the insulative resin is not adhered to the conductive members. The step of eliminating the insulative resin adhered to the conductive members or the like as in the conventional one is unnecessary. On the other hand, the conductive members can be easily sewed and attached by the sewing machine. Therefore, the examination of the material of the adhesive agent, the complicated method of coating the adhesive agent, and the like as in the items (2) and (3) in the conventional examples are unnecessary. The number of steps can be reduced. The costs can be reduced because the process can easily advance to the next step, the number of intermediate parts to be repaired can be decreased, and the like. Moreover, since no adhesive agent is used, there are advantages such that the damper main body is not adhered to the dies upon thermal molding, the damper main body can be easily removed from the dies, and the like.

As another measure according to the invention, there is used a structure of the conductive members such that even if the conductive members are adhered to the damper surface, the conductive members can be shifted for the damper surface.

Figure 7A:
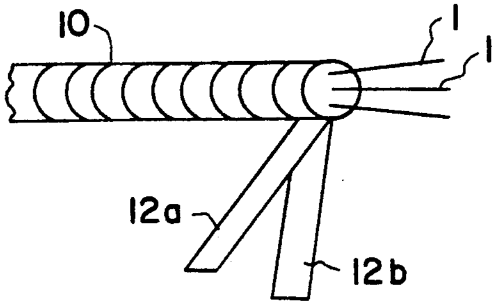
FIGS. 7A and 7B are diagrams showing a woven thread wire around which double conductive foils are wound in accordance with the invention, a plain weave woven wire, and a damper to which the plain weave woven wire is mounted.

The woven wire of the conductive member structure is formed in the following manner as shown in FIG. 7A. That is, two sheets of conductive foils (copper foils) 12*a* and 12*b* are overlaid and wound around twisted fibers 11 and one thin wire-shaped line raw material 10 is formed. A proper number of such wire raw materials 10 are selected and woven. In this manner, the woven wire is formed. Therefore, the inner and outer conductive foil layers 12*a* and 12*b* of the wire raw materials constructing the woven wire can be slightly shifted from each other.

Figure 7B:
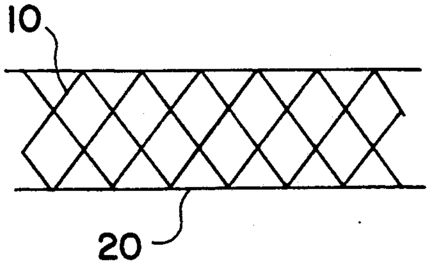
Figure 7C:
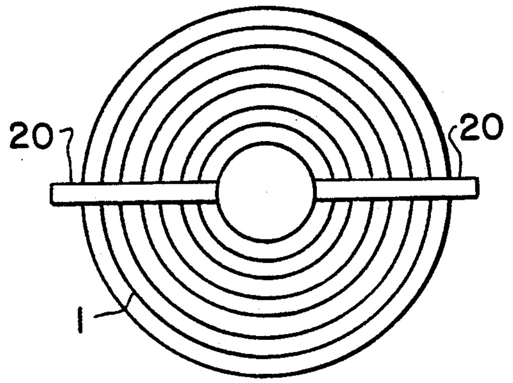

In the embodiment, as shown in FIG. 7B, a flat net-shaped woven wire 20 which is formed by weaving the wire raw materials 10 like a flat net shape is used. FIG. 7C shows an embodiment in which the flat net-shaped woven wire 20 is molded so as to be adhered to the damper 1 by either one of the damper manufacturing methods of the conventional techniques. FIG. 5 shows an embodiment in which after the flat net-shaped woven wire 20 was sewed to the damper raw material 1 by using a thread 3, corrugations are formed by thermally pressing and molding them.

In the case where the woven wire is attached as mentioned above, even if the damper 1 was continuously held in the ultimate using state, i.e., in the large amplitude state for a long time and cracks were generated in the outside conductive foil 12*b*, the inside conductive foil 12*a* is held to the outside copper foil 12*b* so as to be freely movable.

Even if cracks were generated in both of the inside and outside conductive foils 12*a* and 12*b*, since both of the conductive foils are incontact with each other, an audio signal current can be supplied by either one of the conductive foils. What is called, a fail-safe function is effected.

Further, in the case of sewing and attaching the flat net-shaped woven thread wire, since almost of the outside conductive foil is held by the sewing thread 3, the flat net shaped woven thread wire is not peeled off from the corrugations but can accurately operate for a long time.

Although two sheets of conductive foils have been overlaid and wound as the line raw materials, the number of conductive foils is not limited to two but can be set to three or more. On the other hand, the woven wire is not limited to the flat net-shaped woven type but may be a string-shaped woven wire which has conventionally generally been used.

Figure 8A:
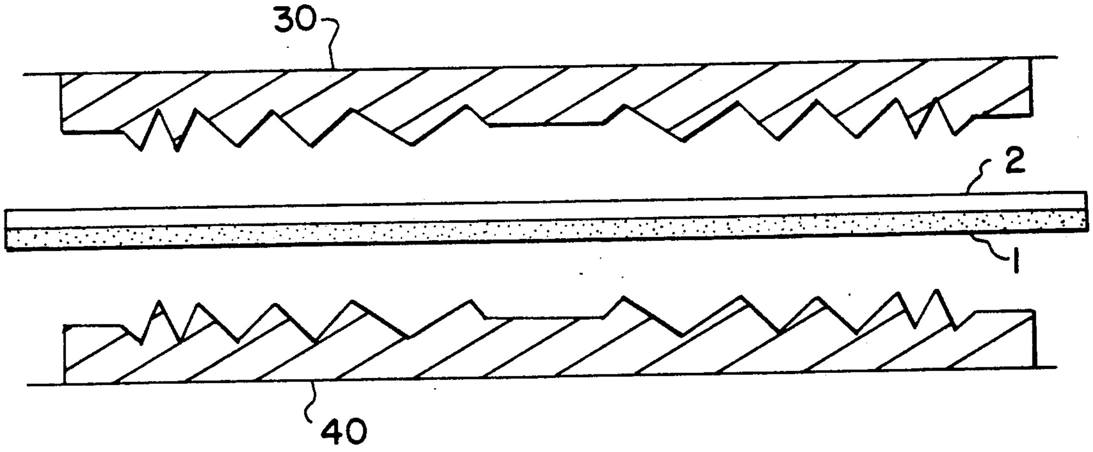
FIGS. 8A and 8B are diagrams showing molding dies which are constructed such that the dimensions of the shape of corrugations increase as the position approaches from the inner peripheral portion to the outer peripheral portion and a damper molded by using such dies in accordance with the invention.
Figure 8B:
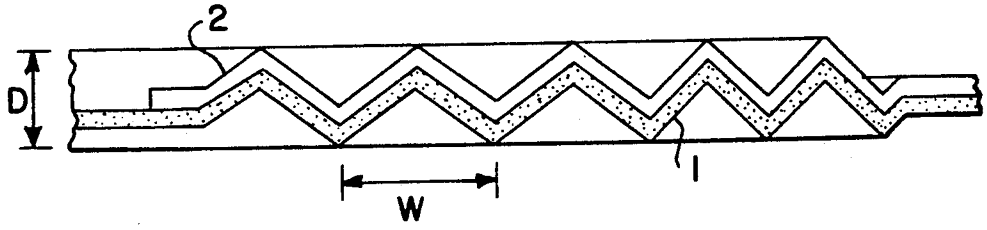

As a further improved example, there is used a die apparatus in which a plurality of annular concave and convex portions are provided for upper and lower dies 30 and 40 as shown in FIG. 8 in order to mold corrugations of the damper and widths among the concave and convex portions on the inner peripheral portion side and the outer peripheral portion side and made different, that is, the width between the concave and convex portions on the inner peripheral portion side is set to be sequentially larger than that on the outer peripheral portion side. The damper raw material from which the resin tackiness was eliminated and the conductive members and overlaid by an adhesive material or the conductive members are sewed and mounted to the damper raw material and they are thermally pressed and molded by the die apparatus. Thus, corrugations are molded in the damper main body 1 and the conductive members 2 are mounted to the damper main body along the corrugations. In this case, even if a larger pulling force acts on the inner peripheral portion side of the conductive members, since the width between the concave and convex portions on the inner peripheral portion side is larger than that on the outer peripheral portion side, the pull-in amount of the material on the inner peripheral portion side is small. Thus, no crack is generated on the inner peripheral portion side of the conductive members.

FIG. 8A shows the speaker damper molded as mentioned above. The width W of the corrugation on the inner peripheral portion side is sequentially widened as the position approaches the corrugation of the outer peripheral portion. The conductive members 2 are attached along the corrugations.

It is also possible to construct in a manner such that after the damper main body 1 was molded by the above die apparatus, the conductive members 2 are set to the upper or back surface of the damper main body 1 and they are pressed by the die apparatus, and the conductive members 2 can be also mounted in conformity with the shapes of the corrugations of the damper main body 1.

In the above example, only the width W among the corrugations has been varied. However, it is also possible to construct in a manner such that a depth D of corrugations is sequentially shallowed as the position approaches from the corrugation on the outer peripheral portion side to the corrugation on the inner peripheral portion side. Further, the width W and depth D can be also sequentially widened and shallowed as the position approaches from the corrugation on the outer peripheral portion side to the corrugation on the inner peripheral portion side.

The above-mentioned woven wire around which the conductive foils were overlaid and wound is used as conductive members, such conductive members are sewed to the damper, and they are molded by using the dies mentioned above. Due to this, many conventional problems regarding the conductive members which are attached to the damper are solved.

What is claimed is:

1. A speaker damper comprising:
- a circular disc-like camper main body of insulation material, the body being flexible; and
- a conductive strip, one end of which is connected to a voice coil and the other end to an external lead, the conductive strip being mounted to said damper main body along a surface of the damper main body in a direction from a center of said damper main body to an outer peripheral portion of said damper main body, wherein the conductive strip is sewed to the damper main body by a fiber.

2. A damper according to claim 1, wherein said conductive strip is made of a woven wire which is formed by overlaying two or more conductive foils onto a fiber.

3. A damper according to claim 1, wherein said damper main body has a plurality of concentric corrugations.

4. A damper according to claim 3, wherein a width of the corrugations becomes wider in said direction from the center of said damper main body to the outer peripheral portion of said damper main body.

5. A damper according to claim 3, wherein a height of the corrugations becomes higher in said direction from the center of said damper main body to the outer peripheral portion of said damper main body.

* * * * *